US012764080B2

(12) United States Patent
Fan et al.

(10) Patent No.: US 12,764,080 B2
(45) Date of Patent: Oct. 13, 2026

(54) INFORMATION PROCESSING METHOD, APPARATUS, ELECTRONIC DEVICE, AND STORAGE MEDIUM

(71) Applicant: Beijing Zitiao Network Technology Co., Ltd., Beijing (CN)

(72) Inventors: Jiayi Fan, Beijing (CN); Haoyu Wang, Beijing (CN); Yilin Huangfu, Beijing (CN); Jinhong Wang, Beijing (CN); Yiqi Wang, Beijing (CN); Guoxing Cui, Beijing (CN); Ning Ma, Beijing (CN); Shaofeng Chen, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 177 days.

(21) Appl. No.: 18/618,707

(22) Filed: Mar. 27, 2024

(65) Prior Publication Data

US 2024/0333667 A1 Oct. 3, 2024

(30) Foreign Application Priority Data

Mar. 28, 2023 (CN) ......................... 202310312648.1

(51) Int. Cl.
*G06F 15/16* (2006.01)
*H04L 51/04* (2022.01)
*H04L 65/1069* (2022.01)

(52) U.S. Cl.
CPC .......... *H04L 51/04* (2013.01); *H04L 65/1069* (2013.01)

(58) Field of Classification Search
CPC ..... H04L 51/04; H04L 65/1069; H04L 51/52; H04L 12/1818; H04L 12/1822
See application file for complete search history.

(56) References Cited

U.S. PATENT DOCUMENTS

2010/0251177 A1* 9/2010 Geppert ................ H04M 3/563 709/206
2021/0217106 A1* 7/2021 Hauser ............... G06Q 30/0241

FOREIGN PATENT DOCUMENTS

CN 103888325 A 6/2014
CN 110224926 A 9/2019
(Continued)

OTHER PUBLICATIONS

Office Action for Chinese Patent Application No. 202310312648.1, mailed on Jun. 27, 2025, 14 pages.
(Continued)

*Primary Examiner* — John B Walsh
(74) *Attorney, Agent, or Firm* — Astute IP Law Group

(57) ABSTRACT

The present disclosure provides an information processing method, an apparatus, an electronic device, and a storage medium. By establishing a session group including a first identity user and a second identity user in response to the first identity user satisfying a preset first condition, pushing a first session message for the first identity user within the session group according to a preset process node, and displaying a first information editing interface for the first identity user, in response to a first preset operation of the first identity user for the first session message, the present disclosure can achieve automatic group creation, automatic reminder through group session, and entry into a relevant information editing interface through group session, thereby achieving efficient distribution and processing of information.

17 Claims, 4 Drawing Sheets

(56) References Cited

FOREIGN PATENT DOCUMENTS

| | | | |
|---|---|---|---|
| CN | 110766378 | A | 2/2020 |
| CN | 112202582 | A | 1/2021 |
| CN | 114911557 | A | 8/2022 |

OTHER PUBLICATIONS

Office Action for Chinese Patent Application No. 202310312648.1, mailed on Oct. 24, 2025, 17 pages.

* cited by examiner

INFORMATION PROCESSING METHOD, APPARATUS, ELECTRONIC DEVICE, AND STORAGE MEDIUM

CROSS-REFERENCE TO RELATED APPLICATION

The present application claims the priority to Chinese Patent Application No. 202310312648.1, filed on Mar. 28, 2023, the entire disclosure of which is incorporated herein by reference as portion of the present application.

TECHNICAL FIELD

The present disclosure relates to an information processing method, an apparatus, an electronic device, and a storage medium.

BACKGROUND

In some scenarios, office systems have problems such as blocked or omitted nodes in past process management, information dispersion, communication asymmetry, and lack of thorough awareness among users. In particular, when a new employee joins a company, the relevant person in charge usually needs to manually remind and guide the new employee to use the office system to enter information, etc., which leads to low information processing efficiency.

SUMMARY

The summary section is provided to introduce the concepts in a concise form, and the concepts will be described in detail in the subsequent detailed description section. The summary section is not intended to identify key or essential features of the claimed technical solutions, nor is it intended to be used to limit the scope of the claimed technical solutions.

In a first aspect, one or more embodiments of the present disclosure provide an information processing method, which includes:

establishing a session group comprising a first identity user and a second identity user in response to the first identity user satisfying a preset first condition, in which there is a preset association relationship between the first identity user and the second identity user;

pushing a first session message for the first identity user within the session group according to a preset process node;

and displaying a first information editing interface for the first identity user, in response to a first preset operation of the first identity user for the first session message.

In a second aspect, one or more embodiments of the present disclosure provide an information processing apparatus, which includes:

a group creation unit, configured to establish a session group comprising a first identity user and a second identity user in response to the first identity user satisfying a preset first condition, in which there is a preset association relationship between the first identity user and the second identity user;

a messaging unit, configured to push a first session message for the first identity user within the session group according to a preset process node;

and an interface display unit, configured to display a first information editing interface for the first identity user, in response to a first preset operation of the first identity user for the first session message.

In a third aspect, one or more embodiments of the present disclosure provide an electronic device, which includes at least one memory and at least one processor; the memory is configured to store program code, and the processor is configured to invoke the program code stored in the memory to enable the electronic device to perform the information processing method provided by one or more embodiments of the present disclosure.

In a fourth aspect, one or more embodiments of the present disclosure provide a non-transitory computer storage medium, the non-transitory computer storage medium stores program code, and the program code, when executed by a computer device, enables the computer device to perform the information processing method provided by one or more embodiments of the present disclosure.

BRIEF DESCRIPTION OF DRAWINGS

The above-mentioned and other features, advantages, and aspects of various embodiments of the present disclosure will become more apparent by combining drawings and referring to the following specific implementation modes. Throughout the drawings, the same or similar reference numerals refer to the same or similar elements. It should be understood that the drawings are illustrative and the components and elements are not necessarily drawn to scale.

DETAILED DESCRIPTION

Figure 1:
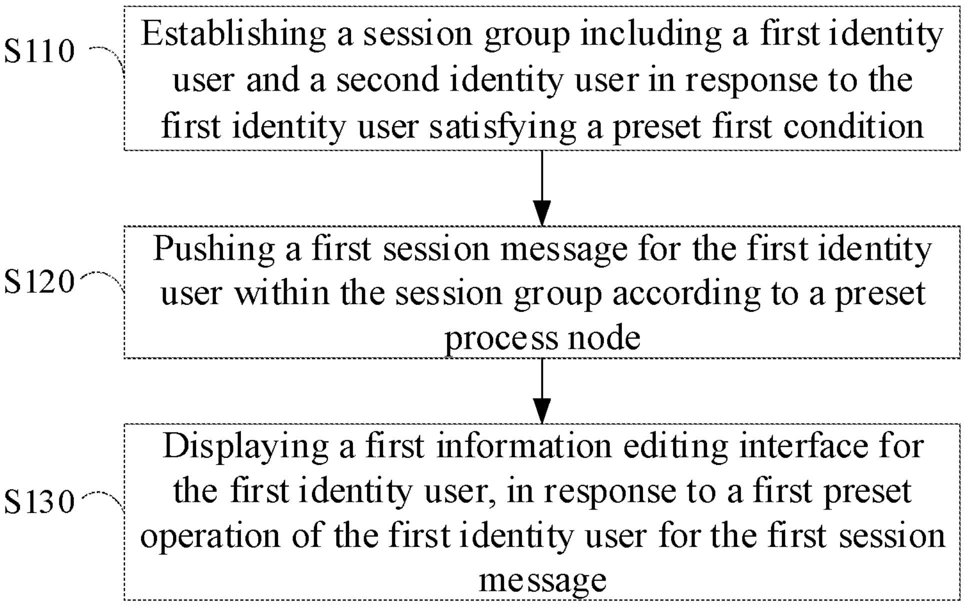
FIG. 1 is a flowchart of an information processing method provided by an embodiment of the present disclosure.

The embodiments of the present disclosure are described in more detail below with reference to the drawings. While certain embodiments of the present disclosure are shown in the drawings, it should be understood that the present disclosure may be embodied in various forms and should not be construed as limited to the embodiments set forth herein. Rather, these embodiments are provided for a thorough and complete understanding of the present disclosure. It should be understood that the drawings and embodiments of the present disclosure are only for exemplary purposes and are not intended to limit the protection scope of the present disclosure.

It should be understood that the various steps described in the method embodiments of the present disclosure may be performed in different orders and/or in parallel. Furthermore, the method embodiments may include additional steps and/or omit performing the illustrated steps. The protection scope of the present disclosure is not limited in this aspect.

As used herein, the term "include," "comprise," and variations thereof are open-ended inclusions, i.e., "including but not limited to." The term "based on" is "based, at least in part, on." The term "an embodiment" represents "at least one embodiment," the term "another embodiment" represents "at least one additional embodiment," and the term "some embodiments" represents "at least some embodiments." The term "in response to" and related terms mean that one signal or event is affected by another signal or event to a certain extent, but not necessarily completely or directly. If event x occurs "in response to" event y, x may respond to y, directly or indirectly. For example, the occurrence of y may eventually lead to the occurrence of x, but there may be other intermediate events and/or conditions. In other cases, y may not necessarily cause x to occur, and x may occur even if y has not yet occurred. Furthermore, the term "in response to" may also mean "at least partially in response to."

The term "determine" broadly encompasses a wide variety of actions, which may include acquiring, calculating, computing, processing, deriving, investigating, looking up (e.g., looking up in a table, database, or other data structure), ascertaining, and similar actions; and may also include receiving (e.g., receiving information), accessing (e.g., accessing data in a memory), and similar actions; and may also include generating, creating, establishing, and similar actions, as well as parsing, selecting, choosing, and similar actions, and the like. Relevant definitions of other terms will be provided in the description below.

It should be noted that concepts such as the "first," "second," or the like mentioned in the present disclosure are only used to distinguish different apparatuses, modules or units, and are not used to limit the interdependence relationship or the order of functions performed by these apparatuses, modules or units.

It should be noted that the modifications of "a," "an," "a plurality of," or the like mentioned in the present disclosure are illustrative rather than restrictive, and those skilled in the art should understand that unless the context clearly indicates otherwise, these modifications should be understood as "one or more."

For the purposes of the present disclosure, the phrase "A and/or B" means (A), (B), or (A and B).

The names of the messages or information exchanged between a plurality of apparatuses in the embodiments of the present disclosure are for illustrative purposes only and are not intended to limit the scope of these messages or information.

Referring to FIG. 1, FIG. 1 illustrates an information processing method provided by an embodiment of the present disclosure, and the method includes steps S110-S130.

Step S110: establishing a session group including a first identity user and a second identity user in response to the first identity user satisfying a preset first condition, in which there is a preset association relationship between the first identity user and the second identity user.

In some embodiments, the preset association relationship includes a management relationship. For example, the second identity user may be a manager of the first identity user in business or personnel terms (such as a team leader, mentor, human resources business partner, etc.), while the first identity user may be a newly hired or about-to-be-employed official employee, intern, etc.

In some embodiments, the preset first condition includes that an account of a target instant messaging application of the first identity user is activated, and the target instant messaging application includes an instant messaging application corresponding to the session group. The following exemplary illustration takes an employee onboarding scenario as an example, after the account of the target instant messaging application assigned to the employee is activated, a session group may be automatically established for the employee and the employee's managers within the target instant messaging application. In a specific implementation, the preset first condition may also include that the first identity user is at a preset process node (such as employee onboarding). For example, the session group may be automatically established once the account of the target instant messaging application of the employee is activated and the employee has joined the company.

It should be understood that, prior to the establishment of the session group, the second identity user already possesses an activated account for the target instant messaging application.

Step S120: pushing a first session message for the first identity user within the session group according to a preset process node.

Figure 2:
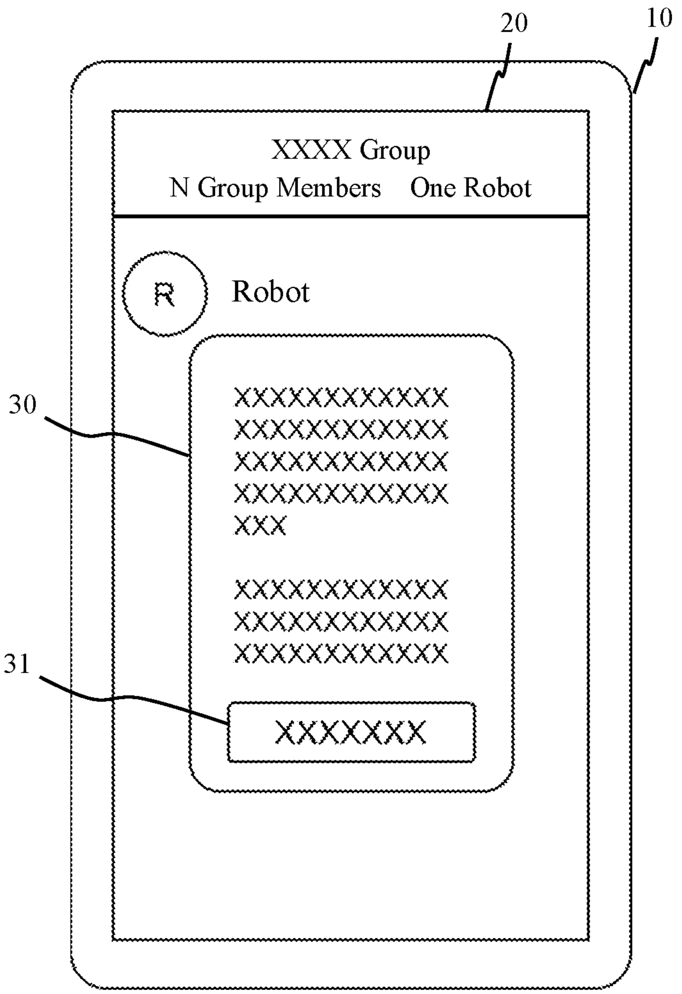
FIG. 2 is a schematic diagram of a display interface of a session group provided by an embodiment of the present disclosure.

In some embodiments, a first session message for the first identity user may be sent automatically (for example, through a group robot) within the session group based on a preset process node. Referring to FIG. 2, the terminal device 10 currently displays a session interface 20 of the session group "XXXX group", the session interface 20 displays a first session message 30 sent in the session group by the group robot, and the first session message 30 displays body content and a preset control 31.

In a specific implementation, the first session message may be pushed within the session group in response to the establishment of the session group; or the first session message may be pushed periodically (such as weekly or monthly) within the session group; or the first session message may be pushed within the session group in response to the first identity user being at a preset process node. For example, taking the application scenario of onboarding a new employee as an example, the first session message may be pushed within the session group in response to the establishment of the session group that includes the new employee (i.e., the first identity user) and a manager of the new employee (i.e., the second identity user); or the first session message may be pushed periodically (such as weekly or monthly) within the session group; or the first session message may be pushed within the session group when the new employee becomes a regular staff member.

It may be understood that the first session message pushed each time may include the same or different content, which may be determined according to the current process node, and the present disclosure does not impose any limitations in this respect.

Step S130: displaying a first information editing interface for the first identity user, in response to a first preset operation of the first identity user for the first session message.

The first preset operation includes but is not limited to somatosensory control operation, gesture control operation, eyeball movement operation, touch operation, voice control instruction, or operation on an external control device.

Exemplarily, referring to FIG. 2, the user may trigger the preset control 31 displayed within the first session message 30 through the first preset operation, causing the terminal device 10 to display the first information editing interface for the first identity user (not shown in FIG. 2).

The first information editing interface is available for the first identity user to fill in the relevant information required. Exemplarily, the first information editing interface may display detailed personnel information of the first identity user (such as name, department, position, date of joining, etc.), and the current stage progress information of the first identity user (such as probationary period, internship period). The first identity user may also fill in the required task information on the first information editing interface for review by the second identity user.

It should be noted that one session group may include one or more users with the first identity, and one or more users with the second identity, the present embodiment does not impose limitations in this respect.

By establishing a session group including a first identity user and a second identity user in response to the first identity user satisfying a preset first condition, pushing a first session message for the first identity user within the session group according to a preset process node, and displaying a first information editing interface for the first identity user, in response to a first preset operation of the first identity user for the first session message, one or more embodiments of the present disclosure can achieve automatic group creation, automatic reminder through group session, and entry into a relevant information editing interface through group session, thereby achieving efficient distribution and processing of information.

In some embodiments, the group name of the session group is determined based on the identity information of the first identity user.

In some embodiments, the information processing method further includes:

pushing a second session message within the session group, in response to an editing operation of the first identity user for the first information editing interface satisfying a preset second condition;

and displaying a second information editing interface for the second identity user, in response to a second preset operation of the second identity user for the second session message.

Exemplarily, the preset second condition may include that the information entered by the first identity user on the first information editing interface satisfies the preset requirements, or the first identity user confirms to submit the information entered by the first identity user on the first information editing interface (for example, the first identity user clicks a control preset on the first information editing interface), and the present disclosure does not impose any limitations in this respect.

The second preset operation may include but is not limited to somatosensory control operation, gesture control operation, eyeball movement operation, touch operation, voice control instruction, or operation on an external control device. In a specific implementation, a group robot may send a second session message for the second identity user within the session group. Similar to the first session message, the second session message may also include body content and a preset control, and the preset control, when triggered by the second identity user, can be used to display the second information editing interface.

By pushing the second session message within the session group in response to an editing operation of the first identity user for the first information editing interface satisfying the preset second condition, and displaying the second information editing interface for the second identity user in response to the second preset operation of the second identity user for the second session message, the present embodiment can promptly remind the second identity user via the second session message after the first identity user has completed editing, and the second session message may be served as an entry point to the second information editing interface to facilitate the second identity user to open the second information editing interface.

In some embodiments, the content of the first session message may also include an identifier specifying the first identity user, explanatory information about the session group, or explanatory information associated with the first information editing interface.

The identifier specifying the first identity user is used to indicate that the first session message is specifically directed to the first identity user. The identifier specifying the first identity user may include a preset designated identifier and a user identifier. For example, the identifier specifying the first identity user may include "@XXX", where "@" is the designated identifier, and "XXX" is the user identifier of the first identity user. In some specific implementations, after the first session message including the identifier specifying the first identity user is sent to the session group, the client of the first identity user will receive a preset notification to alert the first identity user to check the first session message, while the clients of other members in the group will not receive this preset notification.

In some embodiments, the explanatory information about the session group may be used to describe the creation purpose of the session group, the personnel composition of the session group, matters needing attention within the group, etc., to assist group members in quickly utilizing the session group. Exemplarily, the explanatory information about the session group may be included in a first session message that is sent initially.

In some embodiments, the explanatory information associated with the first information editing interface is used to guide the first identity user in using the first information editing interface, thereby facilitating the first identity user in quickly utilizing the first information editing interface.

In a specific implementation, Corresponding format text may be set in advance for the explanatory information about the session group and the explanatory information associated with the first information editing interface for display within the first session message.

In some embodiments, the content of the second session message may also include an identifier specifying the second identity user, to prompt the second identity user to view the second session message. The identifier specifying the second identity user may refer to the previous description of the identifier specifying the first identity user, which will not be described again here.

It may be understood that the first session message pushed each time may include the same or different content, which may be determined according to the current process node, and the present disclosure does not impose any limitations in this respect.

In some embodiments, the second information editing interface is used to display part or all of information entered by the first identity user on the first information editing interface; or the second information editing interface is used to display an editing status of the first information editing interface by the first identity user, which facilitates the second identity user in reviewing the information entered by the first identity user, or in being aware of the first identity user's progress in handling related tasks.

Furthermore, the second information editing interface is used to display part or all of information entered by all first identity users, who have the preset association relationship with the second identity user, on the first information editing interface; or the second information editing interface is used to display editing statuses of the first information editing interface by all first identity users, who have the preset association relationship with the second identity user. In the present embodiment, the relevant information of all first identity users, who have the preset association relationship with the second identity user, may be integrated into the second information editing interface corresponding to the second identity user, which facilitates the second identity user in viewing the relevant information of all first identity users, who have the preset association relationship with the second identity user, via the second session message displayed in the session group corresponding to a specific first identity user, and facilitates the second identity user in centrally managing the first identity users through the second information editing interface.

For example, assuming that the second identity user A has a preset association relationship with first identity users a, b, and c, and in a session group including the user A and the user a (not including users b and c), the user A can view, via the second session message displayed within the session group, a second information editing interface that includes not only related information of the user a but also related information of users b and c.

Furthermore, in some embodiments, the second information editing interfaces corresponding to different types of second identity users display different types of content. For example, if the second identity user has a business management relationship with the first identity user (for example, the second identity user is a team leader or mentor of the first identity user), then the second information editing interface corresponding to the second identity user is used to display part or all of the information entered by the first identity user on the first information editing interface. If the second identity user has a human resource management relationship with the first identity user (for example, the second identity user is a human resources business partner), then the second information editing interface corresponding to the second identity user is used to display the editing status of the first information editing interface by the first identity user. In this way, personalized management for the second identity user can be facilitated by enabling the second information editing interfaces corresponding to different types of second identity users to display different types of content.

In some embodiments, the information processing method further includes:

acquiring personnel information data prior to establishing the session group;

determining the first identity user and the second identity user based on the personnel information data.

Exemplarily, the personnel information data may include information of respective first identity users and information of the second identity user who has a preset association relationship with each of the respective first identity users.

In the present embodiment, the session group including the first identity user and the second identity user can be established by acquiring the personnel information data and determining the first identity user and the second identity user based on the personnel information data.

The following illustration takes the application scenario of onboarding a new employee as an example. A manager user may set responsible personnel in advance for the new employee about to be hired (such as a team leader, mentor, human resources business partner, etc.). Once the account of the target instant messaging application assigned to the new employee is activated, a session group with the new employee and the relevant responsible personnel as group members may be automatically established. After the session group is established, a first session message may be automatically pushed within the session group, and the new employee may enter the first information editing interface via the first session message to fill out probation period goals. Once the new employee fills out the probation period goals, a corresponding second session message may be automatically pushed within the session group, allowing the relevant responsible personnel to view the probation period goals filled out by the new employee. Subsequently, a monthly first session message may be automatically pushed within the session group every month, and the new employee may enter the first information editing interface via the monthly first session message to fill out monthly task information. Once the new employee fills out the monthly task information, a corresponding second session message may be automatically pushed within the session group, allowing the relevant responsible personnel to view the monthly task information filled out by the new employee. Finally, when the new employee's probation period ends, a first session message may be automatically pushed within the session group, allowing the new employee to enter the first information editing interface via the first session message to fill out the regularization application information. Once the new employee fills out the regularization application information, a corresponding second session message may be automatically pushed within the session group, allowing the relevant responsible personnel to view the regularization application information filled out by the new employee.

Figure 3:
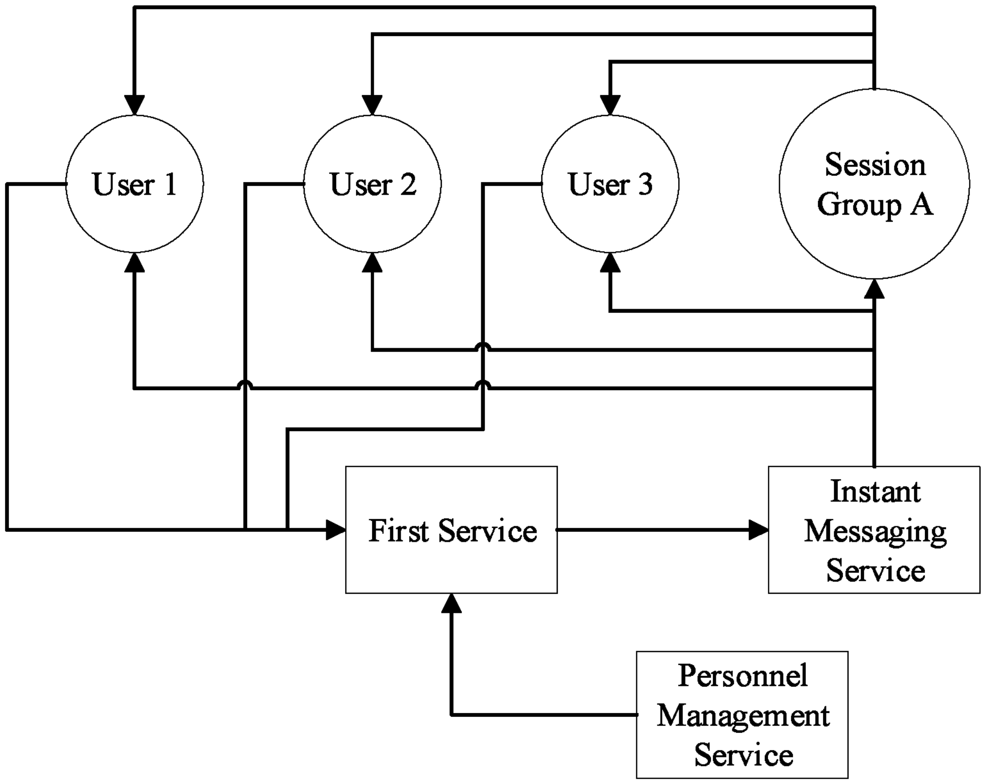
FIG. 3 is a schematic diagram of an information processing system provided by an embodiment of the present disclosure.

FIG. 3 illustrates a schematic diagram of an architecture of an information processing system provided by an embodiment of the present disclosure. Referring to FIG. 3, the information processing system includes a first service, an instant messaging service, and a personnel management service. Personnel information data of the personnel management service may be accessed to the first service, and the first service configures corresponding information editing interfaces for each first identity user and each second identity user based on the personnel information data, so that relevant users can enter the corresponding information editing interface to edit or review information. For relevant information, please refer to the foregoing description of the first information editing interface and the second information editing interface, which will not be described again here.

When the account of a target instant messaging application of a certain first identity user (for example, "User 1" as shown in FIG. 3) is activated, the first service creates a session group (for example, "Session group A" as shown in FIG. 3) through an instant messaging service corresponding to the target instant messaging application. The session group includes the first identity user and the second identity users (for example, "User 2" and "User 3" as shown in FIG. 3) who have a preset association with the first identity user.

In some embodiments, a robot associated with the first service may also be added to the session group, allowing the robot to act as a proxy for the first service and send notification messages within the session group. The robot may be associated with the first service via a link address. The first service may send session messages within the session group via the robot according to the link address.

After the session group is established, the first service may trigger the robot to send a first session message within the session group according to a preset process node, and the first session message may include a preset control. When a client of the first identity user triggers the control, the first information editing interface configured by the first service for the first identity user may be displayed on the client of the first identity user, and the first identity user may then fill in the required content within the first information editing interface.

After the first identity user submits the content filled out on the first information editing interface, the first service may again trigger the robot to send a second session message within the session group. When a client of the second identity user triggers the control, the second information editing interface configured by the first service for the second identity user may be displayed on the client of the second identity user, and the second identity user may then review the information filled out by the first identity user through the second information editing interface.

In this system embodiment, the personnel management service is used to provide personnel information data, the instant messaging service is used to manage the session group and distribute the first and second session messages, and the first service is used to provide the relevant personnel with functions to edit and review information. Through the interconnection and coordination of these three services, efficient distribution, processing, and review of information can be achieved.

Figure 4:
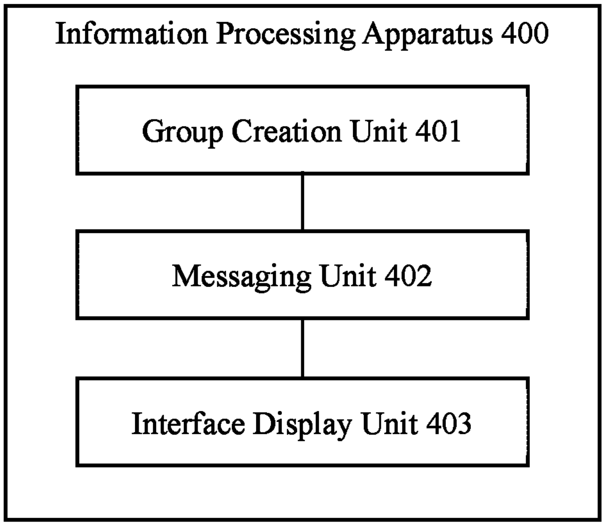
FIG. 4 is a schematic structural diagram of an information processing apparatus provided by an embodiment of the present disclosure.

Correspondingly, referring to FIG. 4, an embodiment of the present disclosure provides an information processing apparatus 400, including:

- a group creation unit 401, which is configured to establish a session group including a first identity user and a second identity user in response to the first identity user satisfying a preset first condition, in which there is a preset association relationship between the first identity user and the second identity user;
- a messaging unit 402, which is configured to push a first session message for the first identity user within the session group according to a preset process node;
- and an interface display unit 403, which is configured to display a first information editing interface for the first identity user, in response to a first preset operation of the first identity user for the first session message.

In some embodiments, the messaging unit is further configured to push a second session message within the session group, in response to an editing operation of the first identity user for the first information editing interface satisfying a preset second condition; and the interface display unit is further configured to display a second information editing interface for the second identity user, in response to a second preset operation of the second identity user for the second session message.

In some embodiments, the second information editing interface is used to display part or all of information entered by the first identity user on the first information editing interface; and/or the second information editing interface is used to display an editing status of the first information editing interface by the first identity user.

In some embodiments, the information processing apparatus further includes:

- a data acquisition unit, which is configured to acquire personnel information data prior to establishing the session group;
- and a user determination unit, which is configured to determine the first identity user and the second identity user based on the personnel information data.

In some embodiments, the association relationship includes a management relationship, and the second identity user includes a manager of the first identity user.

In some embodiments, the preset first condition includes that an account of a target instant messaging application of the first identity user is activated; and the target instant messaging application is an instant messaging application corresponding to the session group.

In some embodiments, content of the first session message includes at least one selected from a group consisting of: an identifier specifying the first identity user, explanatory information about the session group, and explanatory information associated with the first information editing interface.

In some embodiments, a group name of the session group is determined based on identity information of the first identity user.

For the apparatus embodiment, because it basically corresponds to the method embodiment, please refer to the partial description of the method embodiment for relevant details. The apparatus embodiments described above are only illustrative, and the modules described as separate modules may or may not be physically separate. Some or all of the modules may be selected according to actual needs to achieve the purpose of the solution of this embodiment. Persons of ordinary skill in the art can understand and implement the embodiment without any creative effort. By establishing a session group including a first identity user and a second identity user in response to the first identity user satisfying a preset first condition, pushing a first session message for the first identity user within the session group according to a preset process node, and displaying a first information editing interface for the first identity user, in response to a first preset operation of the first identity user for the first session message, the apparatus provided by one or more embodiments of the present disclosure can achieve automatic group creation, automatic reminder through group session, and entry into a relevant information editing interface through group session, thereby achieving efficient distribution and processing of information.

Accordingly, one or more embodiments of the present disclosure provide an electronic device, including:

- at least one memory and at least one processor;
- and the memory is configured to store program code, and the processor is configured to invoke the program code stored in the memory to enable the electronic device to perform the information processing method provided by one or more embodiments of the present disclosure.

Correspondingly, one or more embodiments of the present disclosure provide a non-transitory computer storage medium, the non-transitory computer storage medium stores program code, and the program code, when executed by a computer device, enables the computer device to perform the information processing method provided by one or more embodiments of the present disclosure.

Figure 5:
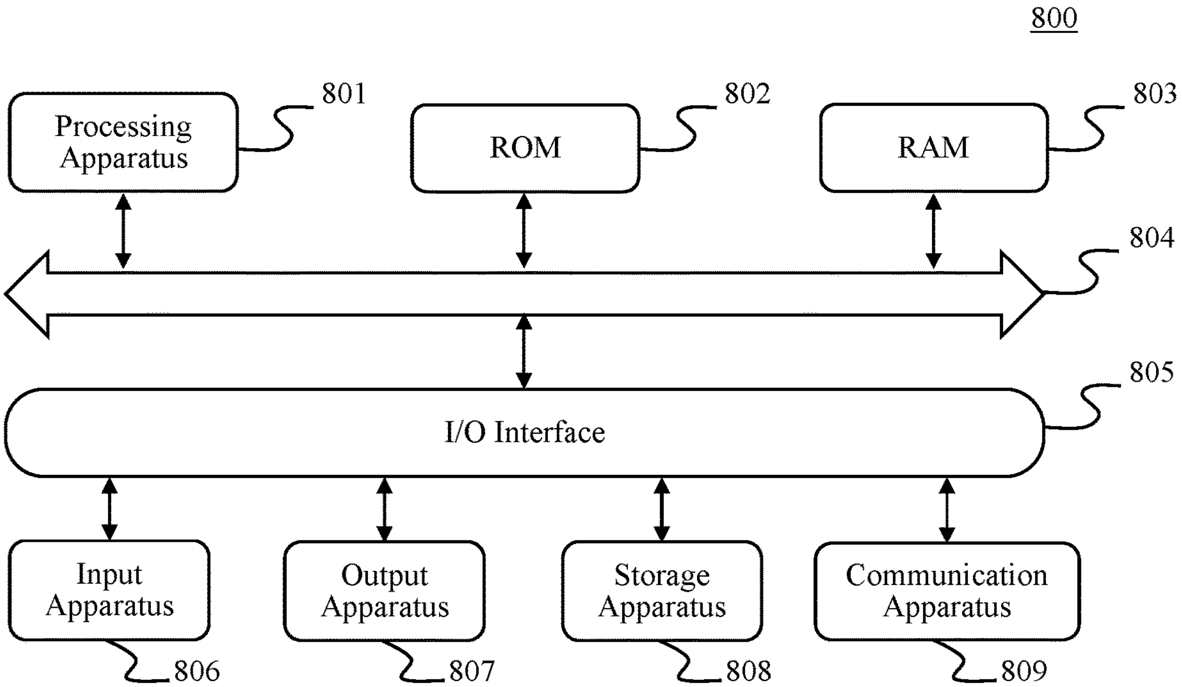
FIG. 5 is a structural schematic diagram of an electronic device provided by an embodiment of the present disclosure.

Referring to FIG. 5, FIG. 5 illustrates a schematic structural diagram of an electronic device 800 (such as a terminal device or a server) suitable for implementing the embodiments of the present disclosure. The terminal devices in the embodiments of the present disclosure may include but are not limited to mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), or the like, and fixed terminals such as a digital TV, a desktop computer, or the like. The electronic device illustrated in FIG. 5 is merely an example, and should not pose any limitations to the functions and the range of use of the embodiments of the present disclosure.

As illustrated in FIG. 5, the electronic device 800 may include a processing apparatus 801 (e.g., a central processing unit, a graphics processing unit, etc.), which can perform various suitable actions and processing according to a program stored in a read-only memory (ROM) 802 or a program loaded from a storage apparatus 808 into a random-access memory (RAM) 803. The RAM 803 further stores various programs and data required for operations of the electronic device 800. The processing apparatus 801, the ROM 802, and the RAM 803 are interconnected through a bus 804. An input/output (I/O) interface 805 is also connected to the bus 804.

Usually, the following apparatuses may be connected to the I/O interface 805: an input apparatus 806 including, for example, a touch screen, a touch pad, a keyboard, a mouse, a camera, a microphone, an accelerometer, a gyroscope, or the like; an output apparatus 807 including, for example, a liquid crystal display (LCD), a loudspeaker, a vibrator, or the like; a storage apparatus 808 including, for example, a magnetic tape, a hard disk, or the like; and a communication apparatus 809. The communication apparatus 809 may allow the electronic device 800 to be in wireless or wired communication with other devices to exchange data. While FIG. 5 illustrates the electronic device 800 having various apparatuses, it should be understood that not all of the illustrated apparatuses are necessarily implemented or included. More or fewer apparatuses may be implemented or included alternatively.

Particularly, according to the embodiments of the present disclosure, the processes described above with reference to the flowcharts may be implemented as a computer software program. For example, the embodiments of the present disclosure include a computer program product, which includes a computer program carried by a non-transitory computer-readable medium. The computer program includes program code for performing the methods shown in the flowcharts. In such embodiments, the computer program may be downloaded online through the communication apparatus 809 and installed, or may be installed from the storage apparatus 808, or may be installed from the ROM 802. When the computer program is executed by the processing apparatus 801, the above-mentioned functions defined in the methods of some embodiments of the present disclosure are performed.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program code. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

In some implementations, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to perform the above-mentioned methods of the present disclosure.

The computer program code for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the drawings illustrate the architecture, function, and operation of possible implementations of systems, methods, and computer program products according to various embodiments of the present disclosure. In this regard, each block in the flowcharts or block diagrams may represent a module, a program segment, or a portion of code, including one or more executable instructions for implementing specified logical functions. It should also be noted that, in some alternative implementations, the functions noted in the blocks may also occur out of the order noted in the drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The units involved in the embodiments of the present disclosure may be implemented in software or hardware. Among them, the name of the unit does not constitute a limitation of the unit itself under certain circumstances.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

One or more embodiments of the present disclosure provide an information processing method, including: establishing a session group including a first identity user and a second identity user in response to the first identity user satisfying a preset first condition, in which there is a preset association relationship between the first identity user and the second identity user; pushing a first session message for the first identity user within the session group according to a preset process node; and displaying a first information editing interface for the first identity user, in response to a first preset operation of the first identity user for the first session message.

The information processing method provided by one or more embodiments of the present disclosure further includes: pushing a second session message within the session group, in response to an editing operation of the first identity user for the first information editing interface satisfying a preset second condition; and displaying a second information editing interface for the second identity user, in response to a second preset operation of the second identity user for the second session message.

According to one or more embodiments of the present disclosure, the second information editing interface is used to display part or all of information entered by the first identity user on the first information editing interface; and/or the second information editing interface is used to display an editing status of the first information editing interface by the first identity user.

The information processing method provided by one or more embodiments of the present disclosure further includes: acquiring personnel information data prior to establishing the session group; and determining the first identity user and the second identity user based on the personnel information data.

According to one or more embodiments of the present disclosure, the association relationship includes a management relationship, and the second identity user includes a manager of the first identity user.

According to one or more embodiments of the present disclosure, the preset first condition includes that an account of a target instant messaging application of the first identity user is activated; and the target instant messaging application is an instant messaging application corresponding to the session group.

According to one or more embodiments of the present disclosure, content of the first session message includes at least one selected from a group consisting of: an identifier specifying the first identity user, explanatory information about the session group, and explanatory information associated with the first information editing interface.

According to one or more embodiments of the present disclosure, a group name of the session group is determined based on identity information of the first identity user.

One or more embodiments of the present disclosure provide an information processing apparatus, including: a group creation unit, which is configured to establish a session group comprising a first identity user and a second identity user in response to the first identity user satisfying a preset first condition, in which there is a preset association relationship between the first identity user and the second identity user; a messaging unit, which is configured to push a first session message for the first identity user within the session group according to a preset process node; and an interface display unit, which is configured to display a first information editing interface for the first identity user, in response to a first preset operation of the first identity user for the first session message.

One or more embodiments of the present disclosure provide an electronic device, which includes at least one memory and at least one processor; the memory is configured to store program code, and the processor is configured to invoke the program code stored in the memory to enable the electronic device to perform the information processing method provided by one or more embodiments of the present disclosure.

One or more embodiments of the present disclosure provide a non-transitory computer storage medium, the non-transitory computer storage medium stores program code, and the program code, when executed by a computer device, enables the computer device to perform the information processing method provided by one or more embodiments of the present disclosure.

The above descriptions are merely preferred embodiments of the present disclosure and illustrations of the technical principles employed. Those skilled in the art should understand that the scope of disclosure involved in the present disclosure is not limited to the technical solutions formed by the specific combination of the above-mentioned technical features, and should also cover, without departing from the above-mentioned disclosed concept, other technical solutions formed by any combination of the above-mentioned technical features or their equivalents, such as technical solutions which are formed by replacing the above-mentioned technical features with the technical features disclosed in the present disclosure (but not limited to) with similar functions.

Additionally, although operations are depicted in a particular order, it should not be understood that these operations are required to be performed in a specific order as illustrated or in a sequential order. Under certain circumstances, multitasking and parallel processing may be advantageous. Likewise, although the above discussion includes several specific implementation details, these should not be interpreted as limitations on the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combinations.

Although the subject matter has been described in language specific to structural features and/or method logical actions, it should be understood that the subject matter defined in the appended claims is not necessarily limited to the specific features or actions described above. Rather, the specific features and actions described above are merely example forms of implementing the claims.

The invention claimed is:

1. An information processing method, comprising:

automatically establishing a session group comprising a first identity user and a second identity user in response to the first identity user satisfying a preset first condition, wherein there is a preset association relationship between the first identity user and the second identity user;

pushing a first session message for the first identity user within the session group according to a preset process node, wherein the first session message displays body content and a preset control, the body content is determined according to a current process node of the first identity user in a business process; and displaying a first information editing interface for the first identity user, in response to a first preset operation of the first identity user for the preset control of the first session message, wherein the first information editing interface is available for the first identity user to fill in relevant information required.

2. The method according to claim 1, further comprising:

pushing a second session message within the session group, in response to an editing operation of the first identity user for the first information editing interface satisfying a preset second condition; and displaying a second information editing interface for the second identity user, in response to a second preset operation of the second identity user for the second session message.

3. The method according to claim 2, wherein the second information editing interface is used to display part or all of information entered by the first identity user on the first information editing interface; and/or the second information editing interface is used to display an editing status of the first information editing interface by the first identity user.

4. The method according to claim 1, further comprising:

acquiring personnel information data prior to establishing the session group; and determining the first identity user and the second identity user based on the personnel information data.

5. The method according to claim 1, wherein the association relationship comprises a management relationship, and the second identity user comprises a manager of the first identity user.

6. The method according to claim 1, wherein the preset first condition comprises that an account of a target instant messaging application of the first identity user is activated; and wherein the target instant messaging application is an instant messaging application corresponding to the session group.

7. The method according to claim 1, wherein content of the first session message comprises at least one selected from a group consisting of:

an identifier specifying the first identity user, explanatory information about the session group, and explanatory information associated with the first information editing interface.

8. The method according to claim 1, wherein a group name of the session group is determined based on identity information of the first identity user.

9. An electronic device, comprising:

at least one memory and at least one processor, wherein the memory is configured to store program code, the processor is configured to invoke the program code stored in the memory to enable the electronic device to perform an information processing method, and the information processing method comprises:

automatically establishing a session group comprising a first identity user and a second identity user in response to the first identity user satisfying a preset first condition, wherein there is a preset association relationship between the first identity user and the second identity user;

pushing a first session message for the first identity user within the session group according to a preset process node, wherein the first session message displays body content and a preset control, the body content is determined according to a current process node of the first identity user in a business process; and displaying a first information editing interface for the first identity user, in response to a first preset operation of the first identity user for the preset control of the first session message, wherein the first information editing interface is available for the first identity user to fill in relevant information required.

10. The electronic device according to claim 9, wherein the information processing method further comprises:

pushing a second session message within the session group, in response to an editing operation of the first identity user for the first information editing interface satisfying a preset second condition; and displaying a second information editing interface for the second identity user, in response to a second preset operation of the second identity user for the second session message.

11. The electronic device according to claim 10, wherein the second information editing interface is used to display part or all of information entered by the first identity user on the first information editing interface; and/or, the second information editing interface is used to display an editing status of the first information editing interface by the first identity user.

12. The electronic device according to claim 9, wherein the information processing method further comprises:

acquiring personnel information data prior to establishing the session group; and determining the first identity user and the second identity user based on the personnel information data.

13. The electronic device according to claim 9, wherein the association relationship comprises a management relationship, and the second identity user comprises a manager of the first identity user.

14. The electronic device according to claim 9, wherein the preset first condition comprises that an account of a target instant messaging application of the first identity user is activated; and wherein the target instant messaging application is an instant messaging application corresponding to the session group.

15. The electronic device according to claim 9, wherein content of the first session message comprises at least one selected from a group consisting of:

an identifier specifying the first identity user, explanatory information about the session group, and explanatory information associated with the first information editing interface.

16. The electronic device according to claim 9, wherein a group name of the session group is determined based on identity information of the first identity user.

17. A non-transitory computer storage medium, wherein the non-transitory computer storage medium stores program code, and the program code, when executed by a computer device, enables the computer device to perform an information processing method, wherein the information processing method comprises:

automatically establishing a session group comprising a first identity user and a second identity user in response to the first identity user satisfying a preset first condition, wherein there is a preset association relationship between the first identity user and the second identity user;

pushing a first session message for the first identity user within the session group according to a preset process node, wherein the first session message displays body content and a preset control, the body content is determined according to a current process node of the first identity user in a business process; and displaying a first information editing interface for the first identity user, in response to a first preset operation of the first identity user for the preset control of the first session message, wherein the first information editing interface is available for the first identity user to fill in relevant information required.

* * * * *